United States Patent
Lehmann

(10) Patent No.: US 6,770,378 B1
(45) Date of Patent: Aug. 3, 2004

(54) COMPOUNDS MADE OF POLYAMIDE SUBSTANCE(S) AND PERFLUOROALKYL SUBSTANCE(S) AND MIXTURES OF THESE COMPOUNDS WITH ADDITIONAL POLYMER SUBSTANCE(S), METHODS FOR THEIR PRODUCTION AND USE

(75) Inventor: Dieter Lehmann, Coswig (DE)

(73) Assignee: Institut fur Polymerforschung E.V. Dresden, Dresden (DE)

( * ) Notice: Subject to any disclaimer, the term of this patent is extended or adjusted under 35 U.S.C. 154(b) by 0 days.

(21) Appl. No.: 09/700,190

(22) PCT Filed: May 14, 1999

(86) PCT No.: PCT/EP99/03303

§ 371 (c)(1),
(2), (4) Date: Jan. 5, 2001

(87) PCT Pub. No.: WO99/61527

PCT Pub. Date: Dec. 2, 1999

(30) Foreign Application Priority Data

May 27, 1998 (DE) .......................................... 198 23 609

(51) Int. Cl.[7] .......................... C08L 77/12; C08L 77/00; C08L 79/08; B32B 27/34

(52) U.S. Cl. ............................. 428/474.4; 428/473.5; 442/59; 442/98; 524/514; 525/131; 525/166; 525/167; 525/178; 525/179; 525/180; 525/183

(58) Field of Search ............................... 525/178, 166, 525/183, 179, 167, 180, 131; 428/473.5, 474; 442/59, 98

(56) References Cited

U.S. PATENT DOCUMENTS 5,576,106 A * 11/1996 Kerbow et al. ............. 428/403
5,750,626 A 5/1998 Shimizu et al. ............. 525/151
6,284,335 B1 * 9/2001 Spohn ..................... 428/36.91

FOREIGN PATENT DOCUMENTS

| DE | 133257 | 12/1978 |
|---|---|---|
| DE | 146716 | 2/1981 |
| EP | 0626424 | 11/1994 |
| EP | 0819734 | 1/1998 |
| EP | 0893478 | 1/1999 |
| JP | 60-179453 | * 9/1985 |
| WO | 91/05013 | 4/1991 |
| WO | 96/17019 | 6/1996 |

OTHER PUBLICATIONS

A. Heger et al., Technology of Radiochemistry on Polymers (Technologie der Strahlenchemie von Polymeren), Akademie–Verlag, Berlin 1990.

Ferse et al., Plastic and Rubber (Plaste und Kautschuk),29 (1982).

* cited by examiner

Primary Examiner—Ana L. Woodward
(74) Attorney, Agent, or Firm—Greenblum & Bernstein, P.L.C.

(57) ABSTRACT

Compounds which, for example, can be used as a compact substance and which are comprised of polyamide substance(s) and perfluoroalkyl substance(s), and to mixtures of these compounds with additional polymer substance(s). Methods for producing such compounds are also provided in which aliphatic and/or partially aromatic homopolyamides and/or copolyamides and/or polyester amides and/or polyether amides and/or polyester ether amides and/or polyimide amides and/or polyamide amides and/or mixtures of these polyamide compound(s) with additional polymer(s) and modified perfluoroalkyl substance(s) are compounded in a single step or multistep and are reactively converted during or afterwards. The homogenization of perfluoroalkyl substance(s) in polyamide substance(s) melted masses is improved.

36 Claims, No Drawings

COMPOUNDS MADE OF POLYAMIDE SUBSTANCE(S) AND PERFLUOROALKYL SUBSTANCE(S) AND MIXTURES OF THESE COMPOUNDS WITH ADDITIONAL POLYMER SUBSTANCE(S), METHODS FOR THEIR PRODUCTION AND USE

BACKGROUND OF THE INVENTION

The invention relates to the fields of chemistry, mechanical engineering, and materials engineering and concerns compounds of polyamide and perfluoralkyl substance(s) and mixtures of these compounds with additional polymer substances which can be used, for example, as a compact substance, as surface modification components, as a filler or as an additive in sliding bearing materials, in anti-frictional films, in lubricating varnishes, in oleophobic and/or hydrophobic partial or compact materials or partial or compact materials equipped therewith, in mouldings, in textile thread, fleece, and/or other textile surface structures, in membrane materials, as a lacquer additive, or as a lacquer substance, as well as a process for the production and use thereof.

In search for polymer materials appropriate for building nuclear reactors, it was determined that polytetrafluoroethylene (PTFE), in contrast to its high chemical and Thermal stability, is extraordinarily sensitive to radiation. Under inert conditions as well as in the present of oxygen, it even decomposes at low absorbed doses, becomes brittle even at 0.2 to 0.3 kGy and crumbly at <100 kGy.

Beginning at approximately 360° C., the purely radiochemical decomposition is noticeably overlaid by a thermal decomposition.

Due to the stochastic progression of the radiochemical decomposition, reaction products form with a wide spectrum of chain lengths.

If PTFE is irradiated in the presence of oxygen, peroxy and alkoxy radicals are formed from the perfluoralkyl radicals that initially formed.

In the course of the intermediate stage of the formation of the alkoxy radical, the perfluoralkyl radical end group is decomposed in stages by shortening the chains and formation of carbonyldifluoride.

In contrast, perfluoralkanic acid fluorides and perfuoralkyl radical end groups form from the alkoxy radical side groups.

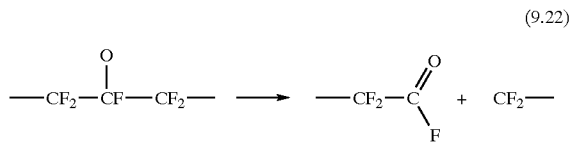

(9.22)

Perfluorized diacids are also formed in very small quantities because two radical center side groups can also form on a perfluorcarbon chain. Unsintered and unpressed PTFE emulsion and suspension polymerizates am of a fibrous-felted character. A transfer, for example, of the anti-adhesive and sliding characteristics of PTFE to other media by integration into aqueous or organic dispersions, polymers, dyes, lacquers, resins, or coatings is not possible because this PTFE cannot be homogenized, but rather tends to form clumps, agglomerates, floods, or settles.

By means of the effect of high-energy radiation with an absorbed dose of approximately 100 kGy, a pourable fine powder is attained from the fibrous-felted polymerizates as a result of the partial decomposition of the polymer chains. This powder still contains loose agglomerates that can be easily separated into primary particles with a particle diameter of <5 $\mu$m. In the case of irradiation in the presence of reactants, functional groups are formed into the polymers. If the irradiation occurs in air, then according to Eq. (9.22) (and subsequent hydrolysis of the —COF groups by means of moisture in the air), carboxyl groups result. If, before irradiation, $(NH_4)_2SO_3$ is mixed in, then groups containing S are to be attained. These functional groups reduce the hydrophobia and organophobia of the PTFE so substantially that the resulting fine powder can be easily homogenized with other media. The positive characteristics of PTFE, such as its excellent anti-frictional, separating, and dry lubrication characteristics as well as its high chemical and thermal stability, are maintained. Carboxyl and sulfonic acid groups to which perfluorized chains are connected also have a high degree of chemical inertness.

Because of the insolubility of tie PTFE and its decomposition products (with the exception of the very submolecular products), the conventional methods of determining molar mass cannot be used. The determination of molar mass must occur in an indirect manner."

The incompatibility with other materials often has a negative effect. By chemically activating PTFE using known methods with (0.1) sodium amide in liquid ammonia and (2.) alkali alkyl and alkali aromatic compounds in aprotic inert solvents, a modification can be achieved. By means of these modifications, boundary surface interactions can be achieved that are reactive or even only improved by adsorptive forces.

Recycling of the products of PTFE decomposition occurs in various fields of use, also as an additive to plastics for the purpose of achieving sliding or antiahesive characteristics. The fine powder substances are more or less finely dispersed as filler components in a matrix In releasing the matrix components, the PTFE fine powder can be eliminated and/or is recovered Although, in the areas of use of PTFE fine powder, an improvement of the characteristics is achieved as compared to the commercial fluorocarbon-free additives, the incompatibility, the insolubility, the loose coupling, and also heterogeneous distribution is disadvantageous for many areas of use.

SUMMARY OF THE INVENTION

The present invention relates to the improvement of the homogenization of perfluoralkyl substances in polyamide melts.

In one aspect, the present invention is directed to a compound comprising at least one modified perfuoralkyl substance homogenized with at least one polyamide in a melt by reactive transformation, and can comprise at least one additional polymeric substance.

The at least one modified perfluoralkyl substance can have functional groups, such as at least one of at least one carboxylic acid group, at least one carboxylic acid halogenide group, and at least one perfluorallylene group.

The at least one modified perfluoralkyl substance can be present at a concentration of 0.01 to 90 weight percent of the compound, preferably 1 to 70 weight percent of the compound.

The present invention is also directed to a process for producing a compound comprising at least one modified perfluoralkyl substance homogenized with at least one polyamide in a melt by reactive transformation, comprising compounding in a melt at least one modified perfluoralkyl substance and at least one polyamide, wherein the at least one polyamide comprises at least one of at least one of aliphatic and partially aromatic homopolyamides, at least one of copolyamides, at least one of polyester amides, at least one of polyether amides, at least one or polyesterether amides, at least one of polyimide amides, and at least one of polyamide amides, and reactively transforming said at least one modified perfluoralkyl substance and said at least polyamide.

The compounding can comprise single-level compounding or multi-level compounding.

The reactive transforming can occur during the compounding, or subsequent to the compounding.

At least one additional polymeric substance can be included. The at least one additional polymeric substance can comprise at least one of at least one polyolefin at least one polyvinyl component, at least one polycondensate, and at least one of polyaddition component. The at least one additional polymeric substance can be added to at least one of the at least one modified perfluoralkyl substance and the at least one polyamide prior to compounding, during compounding or subsequent to compounding.

The at least one polycondensate can comprise at least one of polyesters and polycarbonates, and the at least one polyaddition component can comprise polyurethane.

The at least one polyamide can comprise at least one of polyamide 6, polyamide 6,6 and polyamide 12.

The at least one polyamide can be in pure form or at least one of filled and reinforced materials.

The compounding can be performed in at least one of at least one of a single- and double-screw extruder, a kneader, and in a plasticizing unit of an injection molder.

The reactively transforming can be performed in a melt, with transformation being performed at temperatures at least over the melting point of the at least one polyamide component The temperature can be greater than 200° C.

At least one of before, during and after reactive transformation, reactive masses can be added.

Another reactive transformation can be performed during or after the compounding.

The at least one modified perfluoralkyl substance can comprise radiation-decomposed and modified perfluorocarbons. The at least one modified perfluoralkyl substance can comprise radiation-decomposed and modified polytetrafluoroethylene. The radiation-decomposed and modified polytetrafluoroethylene can comprise fine powder. The polytetrafluoroethylene can be radiation-decomposed and modified with an absorbed dose of greater th 50 kGy, or greater than 100 kGy. The polytetfuoroethylene can be radiaiondecomposed and modified in the presence of reactants, such as oxygen.

The at least one polyamide component and the at least one perfluoralkyl substance can be reactively transformed in at least one of a blending formation and mixed with reactive masses, directly during compounding or during subsequent processing with additional component of at least one of at least one polyolefin polymer, at least one vinyl polymer, at least one polycondensate and at least one polyaddition component.

The present invention is also directed to a compact substance, a surface modification component, a blending component, a bond material, an additive, a sliding bearing, an anti-fiictional film or foil, a lubricating varnish an oleophobic, an hydrophobic material, a moulding, a textile thread or fleece, a textile surface, a multi-layer material, a membrane, a lacquer additive, a lacquer substance, a thermoplastic melt, a reactive mass and/or a solution comprising compounds according to the present invention.

DETAILED DESCRIPTION OF THE INVENTION

With the present invention, compounds of polyamide and perfluoralkyl substances and mixtures of these compounds with additional polymer substances are achieved by means of a reactive melt modification reaction in which the perfluokalkyl component is not only homogeneously distributed as a filler, but also is present to a large extent as being chemically bonded to the polyamide component The perfluoralkyl component can no longer, or not completely, be recovered as a fine powder by means of dissolving the polyamide matrix component By use/processing of modified perfluorakl substances in this melt, modification reaction with polyamide components, homogeneous components can be directly produced in which the perfluoralkyl component is not embedded as an insoluble and incompatible secondary component, as is known. To a large extent, the perfluoralkyl component is present as being chemically coupled with the polyamide by way of bonds and homogeneously distributed, which represents a substantial advantage for the areas of application. As a rest, the perfluoralkly component can no longer be rubbed out or pulled out of the matrix material as a particle as with sliding bearing materials up to now, by means of mechanical forces such as friction For producing such homogeneous compounds, modified perfluoralkyl substances with carboxylic acid and/or carboxylic acid halogenide and/or olefinic groups are used as functional groups.

Preferably used are perfluoralkyl substances that have been radiation-decomposed by irradation and modified, such as, for example, PTFE fine powder that was produced with an irradiation dose of greater than 50 kGy, preferably with an irradiation dose of greater than 100 kGy. By means of the presence of reactants, preferably under the influence of oxygen, perfluoralkly substances are attained that were modified during the radiation decomposition which are preferably present in a modified form with perfluoralkyl carboxylic acid and perfluoralkyl carboxylic acid fluoride groups.

In the process for producing such compounds, commercial melting mixers (single -and double-screw extruders, planetary roll extruders, kneaders, plasticizing units of injection molders, etc.) are used. The PTFE fine powder can be either melted together with the polyamide substance or directly added to the melt. 0.1 to 90 weight percent of radiation-modified perfluoralkyl substance, preferably as PTFE fine powder (relative to the polyamide component) is injected. As preferred weight portions, 1 to 70 weight percent of PTFE fine powder is incorporated into the polyamide component. Surprisingly, the products according to the invention result directly in the melted material modification reaction even though, according to prior art the groups bound to perfluorated chains should have a higher degree of inertness. The reactive formation in a melt is performed at temperatures at least over the melting point of the polyamide component(s) and preferably greater than 200° C.

In order to produce such a compound according to the invention, aliphatic and/or partially aromatic homopolyamides and/or copolyamides and/or polyester amides and/or polyether amides and/or polyesterether amides and/or polyamide amides and/or polyamide amides and/or mixtures of this/these polyamide component(s) with additional polymers and modified perfluoralkyl substance(s) are used as polyamide substance(s).

As polyamide components, polyamide 6 and/or polyamide 6,6 and/or polyamide 12 in their pure form or as filled and/or reinforced materials are preferably used.

In the mixture, the polyamide compounds can be used with additional polymers such as polyolefin(s) and/or polyvinyl component(s) and/or polycondensate(s) such as polyesters and polycarbonates and/or polyaddition compound(s) such as polyethane. Here, such mixture can also be used as a starting substance or added during the compounding or added to the melt after the compounding or converted in a subsequent step. Such a subsequent step would be, for example, the blending of the compounds formed of polyamide component(s) and perfluoralkly substance(s) with additional polymers of the polyolefin type and/or of the vinyl type and/or with polycondensate(s) and/or with polyaddition components and/or the addition of reactive masses in a subsequent processing step.

The production of compounds and resulting products can occur in a multi-step process in which the compound or a resulting product thereof can still be reactively converted during the process or subsequently.

Before and/or during and/or after (i.e., in a subsequent processing step) the reactive transformation of the polyamide components with the perfluoralkyl substance(s), a mixing-in of reactive masses can occur that do not negatively influence the compounding. The product of this transformation can be processed further into the final product by means of a further, i.e., by means of an additional, reactive tansformation during or after the compounding, e.g., by treatment with energy-rich radiation.

The compounds thus produced can be used as a compact substance and/or as surface modification components and/or as blending components and/or as a composite material and/or as an additive.

Here, the use occurs in a pure substance or as an addition/component in sliding bearings and/or in anti-frictional films and/or anti-frictional foils and/or in lubricating vanishes and/or in oleophobic and/or hydrophobic or parts or compact materials equipped therewith and/or in mouldings and/or in textile thread and/or fleece and/or other textile surface structures and/or in multi-layer (film) materials and/or in membranes and/or as a lacquer additive and/or as a lacquer substance.

The products according to the invention can be processed further due to their characteristics as thermoplastic melts and/or as a reactive mass or as a solution or out of the solution.

Kneaders, single- and double-screw extruders, and plasticizing units of injection molders, i.e., all commercial melt mixing systems that are used for plastic processing/compound production, are appropriate as process aggregates.

For one skilled in the art, the result is surprising and more than satisfying. With this melt modification reaction, a polymer product is achieved that up to now had been completely unknown. Such a melt modification reaction with perfluorated substances has not yet been described in the field.

The invention will be explained in greater detail in the following with reference to several exemplary embodiments.

Example 1

In a laboratory kneader (made by the company Brabender), 40 g PA 6 are plasticized at 250° C. and 15 g of a PTFE fine powder that was radiation-modificd at 1000 kGy are added. The compound is separated after 5 min.

The compound is dissolved in formic acid and sprayed onto a polyamide 6 surface. By me of this surface modification, thin hydrophobic and oleophobic layers are achieved with a strongly reduced coefficient of sliding friction (40% reduction of the coefficient of sliding friction). The contact angle measurements with a water drop placed on the surface result in an increase of the contact angle from 65° C. (pure PA-6) to 95° C. (compound).

Example 2

In a laboratory kneader (made by the company Brabender), 40 g PA 6 and 15 g of a PTFE fine powder that was radiation-modified at 500 kGy are simultaneously plasticized at 250° C. The compound is separated after 5 min.

The compound is sprayed by way of low-amount injection moulding towards testing bodies for sliding friction tests. The test of the coefficient of sliding friction resulted in a 35% reduction. The contact angle measurements with a water drop placed on the surface result in an increase of the contact angle from 68° (pure PA6) to 90° C. (compound).

Example 3

In a double-screw extruder (ZSK 30, made by the company Werner & Pfleiderer), 5 kg/h PA-66 and 1 kg/h of a PTFE fine powder that was radiation-modified at 4000 kGy are processed by way of injection moulding at 280° C. The product is granulated and dried.

The compound is sprayed by way of injectors towards testing bodies for sliding friction tests. The testing of the coefficient of sliding to the melt after the compounding or converted with the compounds in a subsequent step.

Example 4

In a double-screw extruder (ZSK 30, by the company Werner & Pfleiderer), 5 kg/h PA-6 and 5 kg/h of a PTFE fine powder that was radiation-modified at 2000 kGy am extruded at 265° C. The product is granulated and dried.

The compound is sprayed by way of injectors towards testing bodies for sliding friction tests. The testing of the coefficient of sliding friction resulted in a decrease by 65%. The contact angle measurements with a water drop placed on the surface result in an increase of the contact angle from 65° C. (pure PA-6) to 105° C. (compound).

Example 5

In a kneader (by the company Buss AG), 5 kg/h PA-6 and 7 kg/h of a PTFE fine powder that was radiation-modified at 2000 kGy are melt mixed at 250° C. The product is granulated and dried.

In a second step, the resulting batch is reactively blended with maleic anhydride grafted polyethylene in a ratio of 10 weight percent batch (compound) and 90 weight percent polyethylene. After injection towards sliding bearings and radiochemical cross linkage, thermally dimensionally stable sliding bearings arc achieved that have a coefficient of sliding friction that has been reduced by 40%.

Example 6

In an injection machine (made by the company Engel), 5 kg/h PA-6 and 1 kg/h of a PTFE fine powder that was radiation-modified at 4000 kGy are plasticized together at 260° C. and injected towards sliding bearings. The sliding bearings have a coefficient of sliding friction that has been reduced by 45%.

Example 7

In a double-screw extruder (ZSK 30, made by the company Werner & Pfleiderer), 5 kg/h PA-6 and 0.5 kg/h of a PTFE fine powder are extruded at 260° C. The melt is extruded on-line to a flat film or a sliding film.

The test of the coefficient of sliding friction resulted in a decrease by 45%. The contact angle measurements with a water drop placed on the surface result in an increase of the contact angle from 68° C. (pure PA6) to 95° C. (flat film as compound).

Example 8

In a laboratory kneader (made by the company Brabender), 30 g PA 6 are plasticized at 250° C. and 30 g of a PTFE fine powder that was radiation-modified at 1000 kGy are added, The compound is separated after 5 min.

The compound is dissolved with PA-6 at a ratio of 1:1 in formic acid and is adjusted to polymers in a concentration of 15 weight percent. Using the phase inversion process, the solution is further processed into a pervaporation membrane. The contact angle measurements with a water drop placed on the surface result in an increase of the contact angle from 68° C. (pure PA-6) to 90° C. (membrane made of the compound, dense separating layer), which signifies a strong moisture-proofing. In the separation of alcohol-water mixture, an increase of the separation factor of 120 is achieved in comparison to pure PA-6 prevaporation membranes.

What is claimed is:

1. A compound comprising at least one perfluoralkyl component modified with functional groups homogenized with at least one polyamide component in a melt by reactive transformation, the at least one modified perfluoralkyl component comprises at least one of at least one carboxylic acid group at least one carboxylic acid halogenide group, or at least one perfluoralkylene group, and the at least one modified perfluoralkyl component comprises at least one radiation-decomposed perfluorocarbon modified in the presence of oxygen.

2. The compound according to claim 1 further comprising at least one additional polymeric substance.

3. The compound according to claim 1 wherein the at least one modified perfluoralkyl component is present at a concentration of 0.01 to 90 weight percent of the compound.

4. The compound according to claim 3 wherein the at least one modified perfluoralkyl component is present at a concentration of 1 to 70 weight percent of the compound.

5. A compact substance comprising the compound of claim 1.

6. A surface modification component comprising the compound of claim 1.

7. A blending component comprising the compound of claim 1.

8. A bond material comprising the compound of claim 1.

9. An additive comprising the compound of claim 1.

10. A sliding bearing comprising the compound of claim 1.

11. An anti-frictional film or foil comprising the compound of claim 1.

12. A lubricating varnish, an oleophobic and/or hydrophobic material, a moulding, a textile thread or fleece, a textile surface, a multi-layer material a membrane, a lacquer additive, or a lacquer substance comprising the compound of claim 1.

13. A thermoplastic melt, a reactive mass or a-solution comprising the compound of claim 1.

14. A process for producing a compound comprising at least one modified perfluoralkyl component homogenized with at least one polyamide component in a melt by reactive transformation, comprising compounding in a melt at least one perfluoralkyl component modified with functional groups and at least one. polyamide component, wherein the at least one polyamide component comprises at least one of at least one of aliphatic and partially aromatic homopolyamides, at least one of copolyamides, at least one of polyester amides, at least one of polyether amides, at least one of polyesterether amides, at least one of polyamide amides, or at least one of polyamide amides, and reactively transforming said at least one modified perfluoralkyl component and said at least polyamide component the at least one modified perfluoralkyl component comprises at least one of at least one carboxylic acid group, at least one carboxylic acid halogenide group, or at least one perfluoralkylene group, and the at least one modified perfluoralkyl component comprises at least one radiation-decomposed perfluorocarbon modified in the presence of oxygen.

15. The process according to claim 14 wherein the compounding comprises a single-level compounding.

16. The process according to claim 14 wherein the compounding comprises a multi-level compounding.

17. The process according to claim 14 wherein the reactive transforming occurs during the compounding.

18. The process according to claim 14 wherein the reactive transforming occurs subsequent to the compounding.

19. The process according to claim 14 further comprising at least one additional polymeric substance in the compound.

20. The process according to claim 14 wherein the at least one additional polymeric substance comprises at least one of at least one polyolefin, at least one polyvinyl component, at least one polycondensate, or at least one of polyaddition component.

21. The process according to claim 20 wherein the at least one additional polymeric substance is added to at least one of the at least one modified perfluoralkyl component and the at least one polyamide component prior to compounding.

22. The process according to claim 20 wherein the at least one additional polymeric substance is added during compounding.

23. The process according to claim 20 wherein the at least one additional polymeric substance is added subsequent to compound.

24. The process according to claim 20 wherein the at least one polycondensate comprises at least one of polyesters and polycarbonates, and the at least one of polyaddition component comprises polyurethane.

25. The process according to claim 14 wherein the at least one polyamide component comprises at least one of polyamide 6, polyamide6,6 or polyamide 12.

26. The process according to claim 25 wherein the at least one polyamide component is in pure form or at least one of filled or reinforced materials.

27. The process according to claim 14 comprising performing the compounding in at least one of at least one of a single- and double-screw extruder, a kneader or in a plasticizing unit of an injection molder.

28. The process according to claim 14 wherein the reactively transforming is performed in a melt, with transformation being performed at temperatures at least over the melting point of the at least one polyamide component.

29. The process according to claim 28 wherein the temperature is greater than 200° C.

30. The process according to claim 14 wherein at least one of before, during or after reactive transformation, reactive masses are added.

31. The process according to claim 14 wherein another reactive transformation is performed during or after the compounding.

32. The process according to claim 14 wherein the at least one modified perfluoralkyl component comprises radiation-decomposed and modified polytetrafluorothylene.

33. The process according to claim 32 wherein the radiation-decomposed and modified polytetrafluoroethylene comprises fine powder.

34. The process according to claim 33 wherein the polytetrafluoroethylene has been radiation-decomposed and modified with an absorbed dose of greater than 50 kGy.

35. The process according to claim 34 wherein the polytetrafluoroethylene has been radiation-decomposed and modified with an absorbed dose of greater than 100 kGy.

36. The process according claim 14 wherein the at least one polyamide component and the at least one perfluoralkyl component are reactively transformed in at least one of a blending formation and mixed with reactive masses, directly during compounding or during subsequent processing with additional at least one of at least one polyolefin polymer, at least one vinyl polymer, at least one polycondensate polymer or at least one polyaddition polymer.

* * * * *